United States Patent [19]

Morio et al.

[11] 4,283,736
[45] Aug. 11, 1981

[54] VIDEO SIGNAL REPRODUCING APPARATUS FOR CONVERTING A VIDEO SIGNAL FROM A FIRST FORMAT TO A SECOND FORMAT

[75] Inventors: Minoru Morio, Tokyo; Tadahiko Nakamura, Kanagawa; Masahiro Kambara; Yukio Kubota, both of Tokyo, all of Japan

[73] Assignee: Sony Corporation, Tokyo, Japan

[21] Appl. No.: 159,611

[22] Filed: Jun. 16, 1980

Related U.S. Application Data

[63] Continuation of Ser. No. 13,672, Feb. 21, 1979, abandoned.

[30] Foreign Application Priority Data

Feb. 21, 1978 [JP] Japan .................. 53-18695

[51] Int. Cl.$^3$ .................. H04N 9/491; H04N 5/02; G11B 5/43; G11B 21/08
[52] U.S. Cl. .................. 358/4; 358/11; 358/140; 360/9; 360/33; 360/76; 360/78
[58] Field of Search .................. 358/4, 11, 140, 127, 358/128.5, 128.6; 360/9–11, 33, 107, 75–78

[56] References Cited

U.S. PATENT DOCUMENTS

| | | | |
|---|---|---|---|
| 3,157,738 | 11/1964 | Okamura | 360/9 |
| 3,283,068 | 11/1966 | Urry et al. | 360/9 |
| 3,787,616 | 1/1974 | Falk et al. | 360/36 |

FOREIGN PATENT DOCUMENTS

4750616  1/1974  Japan .................. 360/10

OTHER PUBLICATIONS

"Television Standards Converter Using Digital Techniques", *The Radio and Electronic Engineer*, vol. 43, No. 3, Mar. 1973, pp. 230–232.

*Primary Examiner*—John C. Martin
*Attorney, Agent, or Firm*—Lewis H. Eslinger; Alvin Sinderbrand

[57] ABSTRACT

In a video signal reproducing apparatus for converting a first video signal having a first field frequency to a second video signal having a second field frequency, there are provided a tape scanning device which is made movable in a direction perpendicular to the recording track on a tape, a system for controlling the speed of the scanning device, a system for shifting the scanning device in the aforesaid direction according to the difference between the first and second field frequencies, in order to skip or repeat selected fields so that the video signal is reproduced with the second field frequency. Also provided is a system for converting the number of lines contained in one field of the first video signal. In the above converting system there is included a memory, and the first video signal is written into the memory and read out therefrom so that a predetermined number of lines of the first video signal are discarded or repeated and the reproduced video signal has the required number of lines for each field of the second video signal.

13 Claims, 27 Drawing Figures

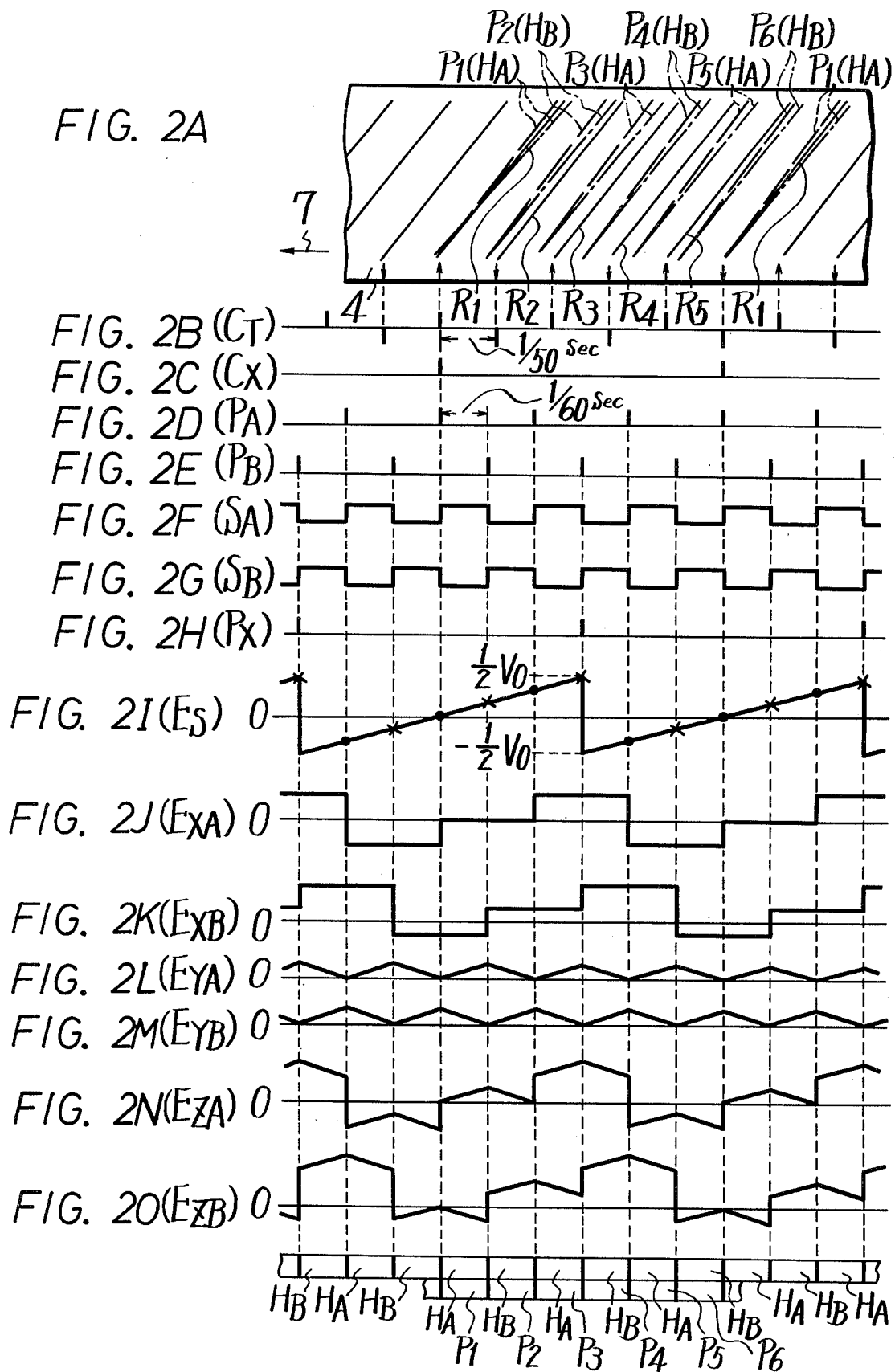

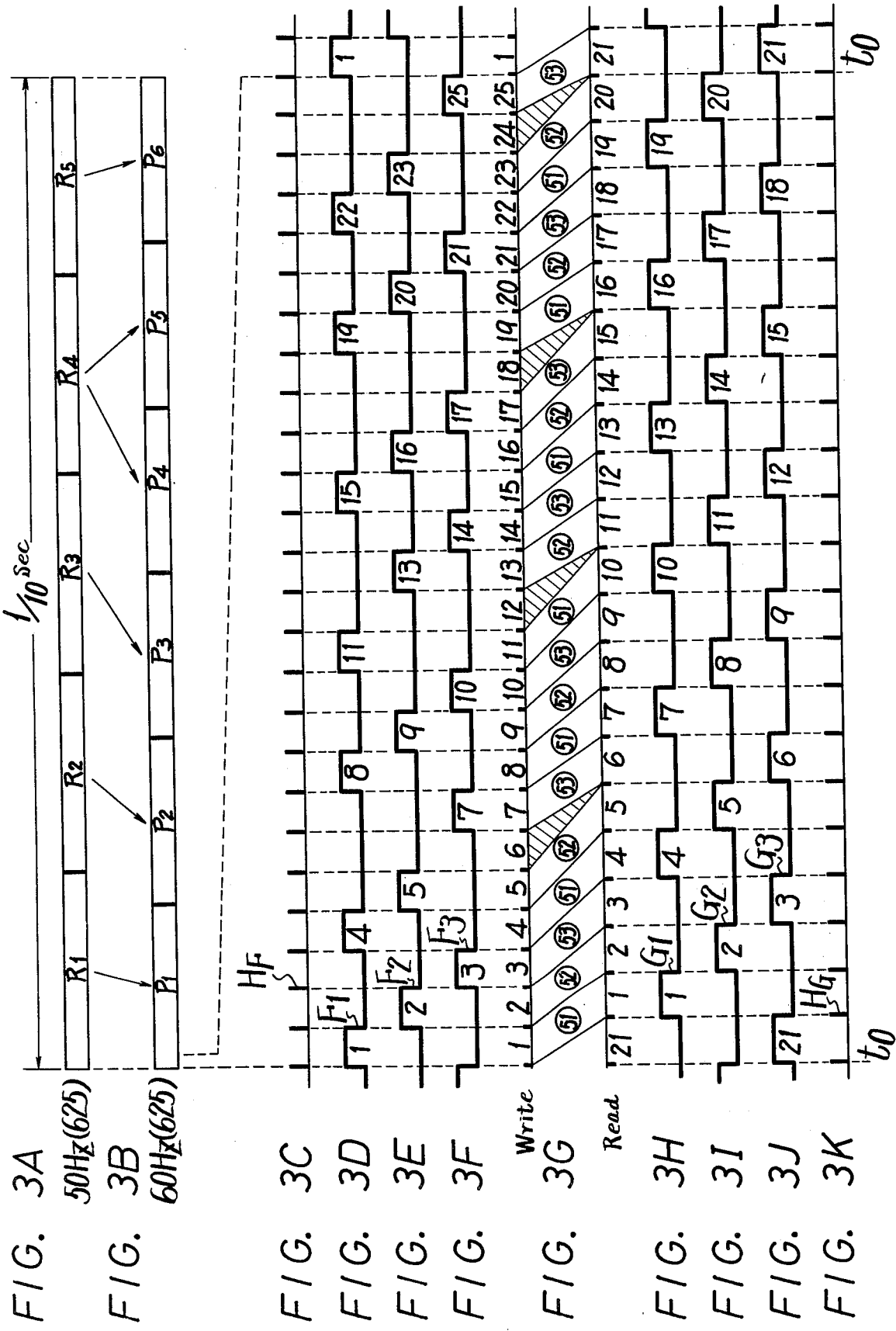

VIDEO SIGNAL REPRODUCING APPARATUS FOR CONVERTING A VIDEO SIGNAL FROM A FIRST FORMAT TO A SECOND FORMAT

RELATED APPLICATION DATA

This is a continuation of our copending application Ser. No. 13,672, now abandoned, filed Feb. 21, 1979, and having a common assignee herewith.

BACKGROUND OF THE INVENTION

1. Field of the Invention

This invention relates to a video signal reproducing apparatus, and in particular is directed to such an apparatus which converts a video signal of a first standard format recorded on a magnetic tape into that of a second standard format.

2. Description of the Prior Art

At present, two different standard systems are have been adopted in most regions of the world as a television broadcasting system. One is an NTSC system mainly used in the United States and Japan, and the other is a CCIR system, such as the PAL system and the SECAM system, mostly used in European countries. Recently, it is frequently desired in a country adopting, for example, the NTSC system to reproduce a video tape recorded with PAL or SECAM format. However, such a reproduction will be impossible unless a PAL or SECAM system video tape recorder and television receiver are prepared. It is quite inconvenient and not economical.

As is well known, the above two television standard systems are different from each other mainly in scanning system and chrominance signal transmitting system. As far as the scanning system is concerned, the NTSC system has a field frequency of 60 Hz and 525 lines in each frame, while the CCIR system has a field frequency of 50 Hz and 625 lines in each frame. Therefore, in order to reproduce a tape recorded with a video signal of, for example, a CCIR system by using a reproducing apparatus for NTSC-system signals, the CCIR scanning system of 50 Hz and 625 lines must be converted to the NTSC scanning system of 60 Hz and 525 lines. In the prior art, however, an apparatus suitable for the above purpose was not available.

SUMMARY OF THE INVENTION

Accordingly, it is an object of this invention to provide a video signal reproducing apparatus in which a video signal recorded on a tape with one standard format is reproduced therefrom as a video signal with another standard format.

It is another object of this invention to provide a video signal reproducing apparatus which can convert the scanning format of one system to that of another system.

In accordance with an aspect of this invention, a video signal reproducing apparatus for reproducing a first video signal having a first field frequency recorded on consecutive tracks of recording tape in which the video signals are reproduced as a second video signal recorded at a second field frequency different from the first field frequency, the apparatus comprising a tape scanning device for reproducing the first video signal from the recording tape which device is disposed to be movable in a direction perpendicular to the tracks, a system for controlling the speed of the above scanning device relative to the recording tape as a function of the second field frequency, and a system for shifting the position of the scanning device in the aforesaid perpendicular direction in response to the difference between the first and second field frequencies.

The video signal reproducing apparatus further includes a system for converting the number of lines contained in one field of the first video signal. This converting system includes a memory into which the first video signal from which the written-in, and thus written signal is then read out with a predetermined number of lines of the first video signal being discarded or repeated so that the reproduced video signal has the required number of lines per field of the second signal. The converting system further includes a read clock generator for producing a read clock pulse having a frequency synchronized with the line frequency of the second video signal, and a write clock generator for producing a write clock pulse having a frequency different from that of the read clock pulse determined by the ratio of the number of lines in each field of the first video signal to the number of lines in each field of the second video signal.

The above and other objects, features and advantages of this invention will be apparent from the following detailed description of an illustrative embodiment thereof which is to be read in connection with the accompanying drawings.

BRIEF DESCRIPTION OF THE DRAWINGS

FIGS. 2A through 2O represent the relationships between recording and reproducing tracks and waveforms of signals or voltages occurring at various places in the circuit of FIG. 1, and FIGS. 3A through 3K represent a time relation between a recorded video signal having a field frequency of 50 Hz and a reproduced video signal having a field frequency converted to 60 Hz and also the relation between the recorded and reproduced signals in connection with the number of lines of the video signal which are discarded.

DETAILED DESCRIPTION OF THE PREFERRED EMBODIMENT

Figure 1:
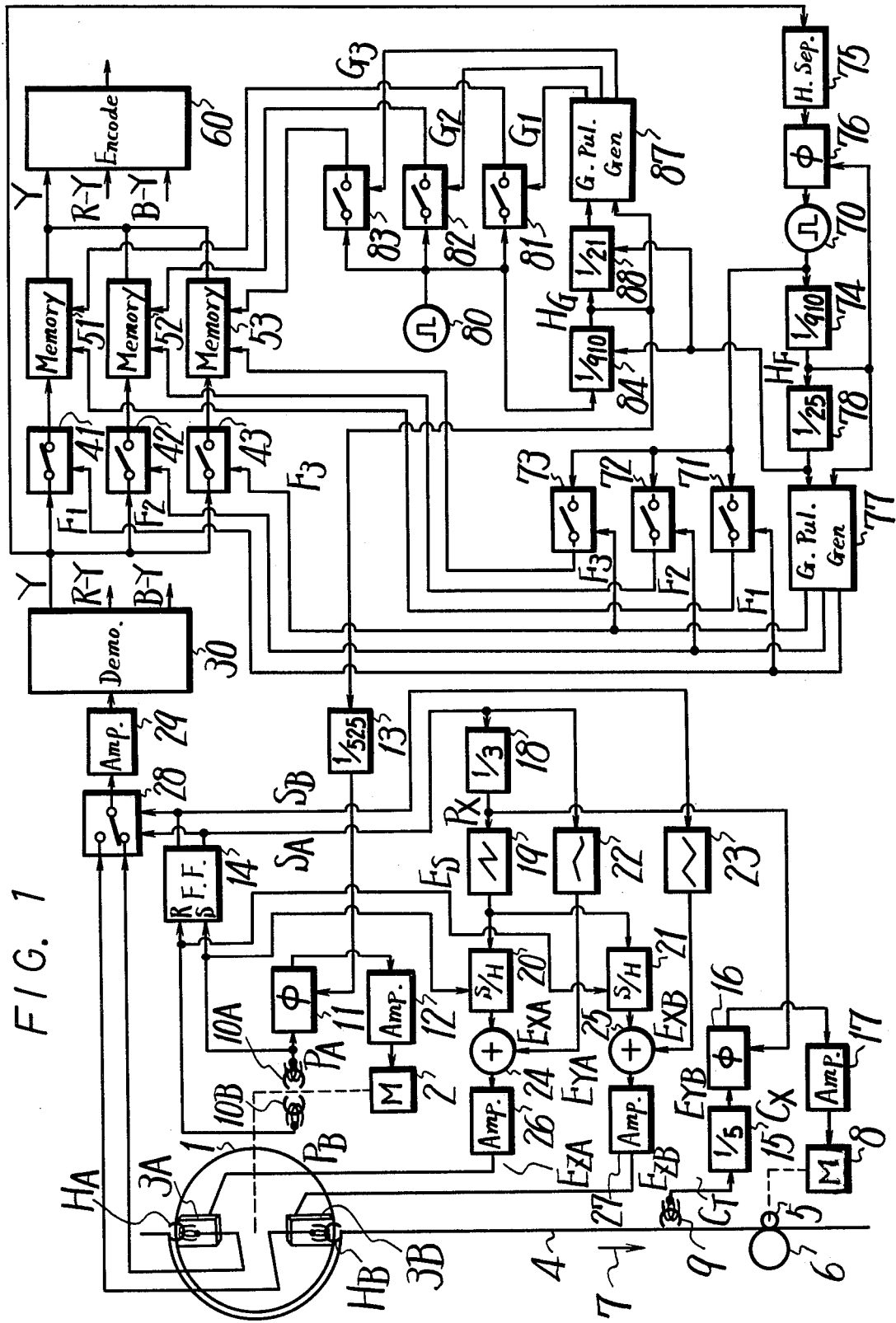
FIG. 1 is a systematic view showing one example of a video signal reproducing apparatus of this invention.

First, consideration will be given to a video recording and reproducing apparatus of the type in which two rotary magnetic heads are provided at an angular distance of 180° therebetween while a magnetic tape is wound obliquely on a little over 180° of the circumferential surface of a guide drum for translation of the tape in the direction along its length.

With the video recording and reproducing apparatus as mentioned above, if there is to be recorded a CCIR signal, that is, a signal having a field frequency of 50 Hz and 625 line intervals in each frame, the rotary magnetic heads are rotated at 25 Hz corresponding to the frame frequency with the tape being moved at a constant speed. As a result, one inclined recording track is formed on the tape at every field, or at every 1/50 second interval.

In this invention, tape is reproduced by moving the tape recorded as above at the same speed as that used in recording; but rotating the magnetic heads at 30 Hz. With such an arrangement, 60 reproducing tracks per second will be reproduced so that the field frequency of 50 Hz can be converted to 60 Hz.

A reproduced signal thus obtained will still keep 625 line intervals in one frame. This reproduced signal is written in a memory, for instance, a charge coupled device (CCD) or bucket brigade device (BBD), and as the above signal stored in the memory is read out therefrom at an appropriately selected clock pulse frequency, a set of 100 non-contiguous line intervals selected from among the 625 line intervals in each frame are discarded with the remainder being made continuous. Thus, the number of line intervals in one frame, or in 1/30 second, can be converted from 625 to 525 line intervals.

Accordingly, the signal recorded according to the CCIR scanning system can be converted into a video signal compatible with the NTSC scanning system.

In the video recording and reproducing apparatus as mentioned above, when an NTSC signal, that is, a signal having a field frequency of 60 Hz and 525 line intervals in each frame, is recorded, the rotary magnetic heads are rotated at 30 Hz corresponding to the frame frequency with the tape being moved at a constant speed. As a result, one inclined recording track is formed on the tape for each field, or at every 1/60 second.

If it is desired to reproduce such a recorded signal to provide a signal compatible with the CCIR system, the tape is reproduced by moving the tape at the same speed as that used in recording but rotating the magnetic heads at 25 Hz. With such an arrangement, 50 reproducing tracks per second will be reproduced so that the field frequency of 60 Hz can be converted to 50 Hz.

A reproduced signal thus obtained will still have 525 line intervals in each frame. This reproduced signal is written into a memory, and the written-in signal is read out from the memory at a properly selected clock pulse frequency so that in each frame, 100 non-contiguous line intervals among the 525 line intervals are repeated or read out twice to provide a total of 625 continuous line intervals. Thus, the number of line intervals in one frame, or in 1/25 second, can be converted from 525 into 625.

Accordingly, the signal recorded according to the NTSC scanning system can be converted into a video signal compatible with the CCIR scanning system.

When making the conversion as mentioned above, the reproduced heads will not correctly trace or scan the recording tracks. For this reason, the rotary magnetic heads are made slightly movable in the direction parallel to its rotating axis, that is, in the direction perpendicular to the recording track, and upon reproducing, the rotary heads are actually moved so that the reproducing heads correctly scan the corresponding recording track.

In other words, when the conversion is carried out from CCIR-system signals (50 Hz) to NTSC-system signals, (60 Hz), four recording tracks out of five recording tracks are respectively reproduced once and the fifth recording track is reproduced twice. On the contrary, when the conversion is carried out from NTSC-system signals to CCIR-system signals, five recording tracks out of six recording tracks are reproduced once and the sixth recording track is omitted.

By using a magnetic sheet recorder of a type in which a magnetic head is moved on a rotating magnetic sheet at a constant speed in a radial direction to form a spiral track, the same conversion as mentioned above can be achieved. In this case, upon reproducing, the magnetic reproducing head is moved at the same speed as in recording, and also the magnetic sheet is rotated at a speed which corresponds to a field frequency of a desired system. Further, if the position of the magnetic head is gradually shifted little by little in the radial direction of the magnetic sheet and hence in the direction perpendicular to the recording track, the reproducing head can be caused to correctly trace or scan the recording track.

FIG. 1 shows one example of a video signal reproducing apparatus according to this invention by which a recorded video signal according to the CCIR system is converted to a video signal compatible with the NTSC system upon reproducing.

In FIG. 1, a tape guide drum 1 consists of an upper drum, which is rotated by a motor 2, and a fixed lower drum. On the upper drum are mounted rotary magnetic heads $H_A$ and $H_B$ with an angular interval of 180° therebetween in a manner that the heads $H_A$ and $H_B$ are slightly movable in the direction parallel to their axis of revolution. Preferably, strip-shaped bi-morph plates 3A and 3B are fixed at one end of each to the upper drum, while the other, or free ends of the bi-morph plates 3A and 3B are attached to the heads $H_A$ and $H_B$. The bi-morph plates 3A and 3B are bent in accordance with the polarity and value of a voltage applied thereto so that the heads $H_A$ and $H_B$ are displaced in the direction parallel to their axis of revolution.

A magnetic tape 4 is wound obliquely about the guide drum 1 over an angular range of a little over 180° and moved in the direction shown by arrow 7 by means of a capstan 5 and a pinch roller 6. The capstan 5 is driven by a motor 8, and a control head 9 is provided in connection with the tape 4. Meanwhile, pulse generators 10A and 10B are provided on the rotating shaft so that pulses $P_A$ and $P_B$ are produced when the heads $H_A$ and $H_B$ arrive at positions where they commence scanning of the tape 4.

The tape 4 is recorded with a video signal according to the CCIR system as described above. In FIG. 2A, inclined solid lines $R_1$, $R_2$, ..., $R_5$ indicate recorded tracks, in which a color video signal is recorded with a luminance signal being frequency-modulated and a chrominance signal being converted into a low frequency range.

A control pulse is also recorded along an edge of the tape as a rectangular wave having a frequency of 25 Hz, which is the frame frequency in the CCIR system, and a duty cycle of 50%. In FIG. 2A, an upward arrow represents the rising edge of the rectangular wave and a downward arrow represents the falling edge thereof.

The reproducing operation from the tape 4 will be carried out in the following manner. The pulse $P_A$ from the pulse generator 10A is fed to a phase comparator 11 where it is compared in phase with a reference pulse of 30 Hz and a compared error voltage therefrom is supplied through an amplifier 12 to the motor 2 so that the heads $H_A$ and $H_B$ may rotate at a frequency of 30 Hz as mentioned above.

As the reference pulse, there is used, for example, a frequency-divided pulse derived from a reading clock pulse, which will be mentioned below. Now assuming that, the NTSC system color subcarrier frequency of 3.58 MHz is taken as $f_{SN}$ and the NTSC system line frequency of 15.734 KHz is taken as $f_{HN}$, an oscillator 80 produces a reading clock pulse having a frequency of $4 f_{SN} = 910 f_{HN} = 14.318$ MHz, which is applied to a frequency divider 84 where its frequency is divided by 910 to derive therefrom a pulse $H_G$ having a frequency of $f_{HN} = 15.734$ KHz. This pulse $H_G$ is fed to a frequency divider 13 where its frequency is further divided by 525 to obtain the reference pulse of 30 Hz; which is fed to the phase comparator 11 as mentioned above.

The heads $H_A$ and $H_B$ are thus rotated at the frequency of 30 Hz and hence the pulses $P_A$ and $P_B$ each have a period of 1/30 second and an interval of 1/60 second therebetween, as shown in FIGS. 2D and 2E.

These pulses $P_A$ and $P_B$ are supplied to a flip-flop circuit 14 at its set terminal and reset terminal, respectively. The flip-flop circuit 14 then delivers a pulse $S_A$, which is "1" during an interval when the head $H_A$ scans the tape 4 and "0" during an interval when the head $H_B$ scans the tape 4 as shown in FIG. 2F, and also delivers a pulse $S_B$, which is the inverse of the pulse $S_A$ as shown in FIG. 2G.

Meanwhile, the tape 4 is moved at the same speed as that used in recording, so that the control head 9 reproduces a control pulse $C_T$ with its positive pulse corresponding to the rising edge of the control pulse recorded on the tape 4 and its negative pulse corresponding to the falling edge of the same and having an interval of 1/50 second between the above positive and negative pulses, as shown in FIG. 2B. This reproduced control pulse $C_T$ is fed to a frequency divider 15 where its frequency is divided by 5 to derive therefrom a pulse $C_X$ having a period of 1/10 second, as shown in FIG. 2C. At the same time, the signal $S_A$ from the flip-flop circuit 14 is applied to a frequency divider 18 to divide its frequency by 3 to obtain a pulse $P_X$ having the period of 1/10 second as shown in FIG. 2H. This pulse $P_X$ is supplied to a phase comparator 16 to compare its phase with that of the pulse $C_X$ and a compared error voltage therefrom is supplied through an amplifier 17 to the motor 8 so that the pulses $C_X$ and $P_X$ will be in a constant phase relation as shown in FIGS. 2C and 2H, respectively. As a result, the speed of the tape is controlled such that the reproducing head scans a recording track at its beginning portion. In FIG. 2A, inclined broken lines $P_1, P_2, \ldots, P_6$ indicate the path scanned or traced by the reproducing heads, and the reproducing track $P_1$ corresponding to the head $H_A$ being correctly located, on the recorded track $R_1$ at its beginning portion.

The residual reproducing paths $P_2$ to $P_6$, as scanned by the heads $H_A$, $H_B$, are not correctly located on the corresponding recording tracks. For this reason, the pulse $P_X$ from the frequency divider 18 is supplied to a serrated wave voltage generating circuit 19 to produce a serrated wave voltage $E_S$ having a period of 1/10 second, which becomes zero at a time point when the head $H_A$ starts to scan along the path $P_1$ and changes from its maximum value $\frac{1}{2} V_0$ to its minimum value $-\frac{1}{2} V_0$ at a time when the head $H_B$ starts to scan the path $P_4$, as shown in FIG. 2I.

This serrated wave voltage $E_S$ is fed to sample-and-hold circuits 20 and 21 where it is sampled and held by the pulses $P_A$ and $P_B$, respectively, to obtain step-like sampled-and-held voltages $E_{XA}$ and $E_{XB}$ as shown in FIGS. 2J and 2K.

It should be noted that the voltage $E_{XA}$ has different values corresponding to the directions and amounts of shifting required to adjust the paths $P_1$, $P_3$ and $P_5$ relative to the recording tracks $R_1$, $R_3$ and $R_4$ during respective intervals where the paths $P_1$, $P_3$ and $P_5$ are traced by the head $H_A$, and similarly the voltage $E_{XB}$ has different values corresponding to the directions and amounts of shifting required to adjust the paths $P_2$, $P_4$ and $P_6$ relative to the recording tracks $R_2$, $R_4$ and $R_5$ during respective intervals where the paths $P_2$, $P_4$ and $P_6$ are traced by the head $H_B$.

The value of the above-mentioned voltage $V_0$ is so selected that when such voltage $V_0$ is applied through amplifiers 26 and 27 to the bi-morph plates 3A and 3B, the heads $H_A$ and $H_B$ are moved by a distance corresponding to the pitch of a recording track in a direction opposite to the direction of advancement of the tape 4. Accordingly, if the voltages $E_{XA}$ and $E_{XB}$ are applied through the amplifiers 26 and 27 to the bi-morph plates 3A and 3B, the paths $P_1$, $P_2$, $P_3$, $P_4$, $P_5$ and $P_6$ will be shifted from the track positions indicated by broken lines to be respectively located correctly on the recording tracks $R_1$, $R_2$, $R_3$, $R_4$, $R_4$, and $R_5$ at the respective beginning portions thereof.

Upon reproducing, if the speed of advancement of the tape 4 is the same as that used during recording, and the rotational speed of the heads $H_A$ and $H_B$ is different from that used during recording, the inclinations of the paths scanned by the heads $H_A$, $H_B$ are also different from those of the recording tracks $R_1$, $R_2$, ... Now assuming that the sampled-and-held voltages $E_{XA}$ and $E_{XB}$ are not fed to the bi-morph plates 3A and 3B, the slant tracks $P_1$, $P_2$, ..., $P_6$ shown by one dot-dash lines in FIG. 2A will become the paths traced by the reproducing heads $H_A$, $H_B$. Therefore, even though the voltages $E_{XA}$ and $E_{XB}$ are applied to the bi-morph plates 3A and 3B, the head $H_A$ or $H_B$ will only just located on the recording track at the time when the pulse $P_A$ or $P_B$ is obtained, that is, the paths $P_1$, $P_2$, $P_3$, $P_4$, $P_5$ and $P_6$ correctly on the recording tracks $R_1$, $R_2$, $R_3$, $R_4$, $R_4$ and $R_5$ only at the respective starting portions. The reproducing tracks are shifted away therefrom according as they move toward the respective end portions, and at such end portions they are shifted from the respective recording tracks by a distance corresponding to 1/6 of the pitch of recording track in a moving direction of the tape 4.

For this reason, the signals $S_A$ and $S_B$ from the flip-flop circuit 14 are supplied to triangular wave voltage generating circuits 22 and 23. Thus, the circuit 22 produces a triangular wave voltage $E_{YA}$ which is changed linearly from zero to $1/6V_0$ during an interval where the paths $P_1$, $P_3$ and $P_5$ are traced by the head $H_A$ as shown in FIG. 2L, and the circuit 23 produces a triangular wave voltage $E_{YB}$ which is changed linearly from zero to $1/6V_0$ during an interval where the paths $P_2$, $P_4$ and $P_6$ are traced by the head $H_B$ as shown in FIG. 2M. At an adder 24, the sampled-and-held voltage $E_{XA}$ and the triangular wave voltage $E_{YA}$ are added to each other to obtain a control voltage $E_{ZA}$ as shown in FIG. 2N, while at an adder 25, the sampled-and-held voltage $E_{XB}$ and the triangular wave voltage $E_{YB}$ are added to each other to obtain a control voltage $E_{ZB}$ as shown in FIG. 2O. These control voltages $E_{ZA}$ and $E_{ZB}$ are supplied through the amplifiers 26 and 27 to the bi-morph plates 3A and 3B. As a result, the paths $P_1$, $P_2$, $P_3$, $P_4$, $P_5$ and $P_6$ traced by the heads $H_A$, $H_B$ will correctly follow the recording tracks $R_1$, $R_2$, $R_3$, $R_4$, $R_4$ and $R_5$ throughout from the starting portions to the end portions.

It should be herein noted that the serrated, wave voltage $E_S$ shown in FIG. 2I may be directly applied to the heads $H_A$ and $H_B$ in order to cause the paths $P_1$–$P_6$ to follow the recording tracks $R_1$–$R_5$ correctly.

Thus, there is obtained a reproduced video signal having a field frequency converted to 60 Hz. FIGS. 3A and 3B show the time relation between the recorded and reproduced video signals. At this condition, the number of line intervals in each frame of the reproduced signal is still 625 and the line frequency thereof is (625/525) $f_{HN} = 18.731$ KHz.

The reproduced signals obtained from the heads $H_A$ and $H_B$ are applied to a switch circuit 28 which is changed over by the signals $S_A$ and $S_B$ from the flip-flop circuit 14, and the reproduced signal passed through the switch circuit 28 is supplied through an amplifier 29 to a demodulator 30, in which the frequency-modulated luminance signal is demodulated and also the chrominance signal converted to the lower frequency range is again frequency-converted into its original frequency range and such chrominance signal is further color-demodulated. Thus, the demodulator 30 delivers a luminance signal Y, a red color difference signal R-Y and a blue color difference signal B-Y. Even at this stage, the number of line intervals in one frame is 625 and the line frequency is (625/525) $f_{HN} = 18.731$ KHz.

The luminance signal Y is then supplied to three switch circuits 41, 42 and 43.

Meanwhile, a voltage-controlled oscillator 70 is provided to produce a writing clock pulse having a frequency which is 625/525 of the frequency 910 $f_{HN}$, the latter being the frequency of the reading clock pulse from the oscillator 80. Thus, the writing clock pulse frequency is 17.045 MHz. This writing clock pulse is frequency-divided by 910 in a frequency divider 74 to obtain a pulse $H_F$ having a frequency of (625/525) $f_{NH} = 18.731$ KHz. At the same time, the luminance signal Y from the demodulator 30 is supplied to a horizontal synchronizing signal separator 75 to derive therefrom a horizontal synchronizing signal which is compared in phase with the pulse $H_F$ at a phase comparator 76. A compared error voltage from the phase comparator 76 is applied to the voltage-controlled oscillator 70 to control the same so that the oscillator 70 is synchronized with the horizontal synchronizing signal and the pulse $H_F$ is made coincident with the occurrence of the horizontal synchronizing signal.

This pulse $H_F$ is applied to a gate pulse generator 77. The pulse $H_F$ is also fed to a frequency divider 78 where it is frequency-divided by 25 to obtain a pulse at a time $t_0$. This pulse is also applied to the gate pulse generator 77 to derive therefrom three gate pulses $F_1$, $F_2$ and $F_3$ which are generated as one cycle for twenty-five consecutive line intervals of the luminance signal from the demodulator 30, as shown in FIGS. 3D, 3E and 3F.

These gate pulses $F_1$, $F_2$ and $F_3$ are supplied to the switch circuits 41, 42 and 43 so that the switch circuits 41, 42 and 43 are respectively closed at intervals when the gate pulses $F_1$, $F_2$ and $F_3$ respectively become "1" to permit the luminance signals to pass therethrough. These luminance signals are respectively fed to memories 52, 52 and 53 each having 910 stages. It should be herein noted that no gate pulse will be generated at the 6th, 12th, 18th and 24th line intervals among the successive twenty-five line intervals as shown in FIGS. 3D, 3E and 3F.

At this time, the writing clock pulse from the voltage-controlled oscillator 70 is fed to three gate circuits 71, 72 and 73, while the gate pulses $F_1$, $F_2$ and $F_3$ are also supplied to the gate circuits 71, 72 and 73 as their control signals. Thus, the gate circuits 71, 72 and 73 have derived therefrom respective writing clock pulses at the intervals where the gate pulses $F_1$, $F_2$ and $F_3$ respectively become "1." These writing clock pulses from the gate circuits 71, 72 and 73 are respectively supplied to the memories 51, 52 and 53. Accordingly, the luminance signal from the demodulator 30 is sequentially written in the memories 51, 52 and 53 at line intervals excepting the 6th, 12th, 18th and 24th line intervals among the continuous twenty-five line intervals, as shown in FIGS. 3D, 3E and 3F.

As described above, the reading clock pulse having a frequency of 910 $f_{HN}$ obtained from the fixed frequency oscillator 80 is frequency-divided by 910 at the frequency divider 84 to obtain the pulse $H_G$ having the frequency of $f_{HN}$, or 15.734 KHz. This pulse $H_G$ is further divided by 21 at a frequency divider 88. Since the frequency of the pulse $H_G$ is 525/625, or 21/25, of that of the pulse $H_F$, twenty-one periods of the pulse $H_G$ will correspond to a time period equal to twenty-five line intervals of the luminance signal obtained from the demodulator 30. Then, the frequency dividers 84 and 88 are reset by the pulse from the frequency divider 78, so that a pulse signal $H_G$ synchronized with the pulse $H_F$ is obtained at every twenty-one pulses $H_G$ as shown in FIG. 3C and FIG. 3K.

The pulse $H_G$ and the pulse from the frequency divider 88 are supplied to a gate pulse generator 87 to derive therefrom three gate pulses $G_1$, $G_2$ and $G_3$ which are sequentially generated as one cycle for twenty-one successive periods of the pulse $H_G$ corresponding to the twenty-five continuous line intervals of the luminance signal from the demodulator 30, as shown in FIGS. 3H, 3I and 3J.

Then, the reading clock pulse from the oscillator 80 is fed to three gate circuits 81, 82 and 83, while the gate pulses $G_1$, $G_2$ and $G_3$ are also fed to the gate circuits 81, 82 and 83, so that reading clock pulses are derived therefrom at respective intervals where the gate pulses $G_1$, $G_2$ and $G_3$ respectively become "1." These reading clock pulses from the gate circuits 81, 82 and 83 are respectively supplied to the memories 51, 52 and 53.

Accordingly, as shown in FIG. 3G, the line intervals excepting the 6th, 12th, 18th and 24th line intervals among the continuous twenty-five line intervals sequentially written into the memories 51, 52 and 53 are read out sequentially as the 1st, 2nd, ..., 21st line intervals. The line intervals read out from the respective memories 51, 52 and 53 are supplied to an NTSC system encoder 60 as a composite continuous video signal.

As described above, the continuous twenty-five line intervals of the luminance signal from the demodulator 30 are read out of the memories 51, 52, 53 as twenty-one continuous line intervals. As a result, 625 continuous line intervals of the luminance signal from the demodulator 30 are read out as 525 continuous line intervals so that the number of line intervals in one frame is converted into 525. Simultaneously, the line frequency is also converted to 15.734 KHz.

Though not shown in FIG. 1, the red color difference signal and the blue color difference signal obtained from the demodulator 30 are processed entirely in the same manner as the above luminance signal, in which the number of line intervals in one frame is converted from 625 to 525 by respective three memory systems and supplied to the NTSC encoder 60.

Then, the NTSC encoder 60 delivers a television signal or video signal which is compatible with a NTSC system television receiver.

The switch circuits 41, 42 and 43 may also be provided at the output sides of the memories 51, 52 and 53 and closed at intervals where the reading gate pulses $G_1$, $G_2$ and $G_3$ respectively become "1."

The conversion from, NTSC-system signals to CCIR-system signals can also be achieved by the technique as described herein. In such case, however, upon converting the line frequency, some of line intervals are repeated or read out twice, so that a system having four memories will be required.

As described above, when the reproduction of a recorded video signal is carried out by the video signal reproducing apparatus of this invention, a signal recorded according to one scanning system can be easily converted into a reproduced signal compatible with another scanning system. Accordingly, when a video tape or the like prepared in an area adopting one broadcasting system is intended to be reproduced at another area where another broadcasting system has been adopted, it is not necessary to prepare a monitor receiver of one system, and hence world-wide usage of any video program can be easily achieved.

It will be apparent that many modifications and variations may be effected without departing from the scope of the novel concepts of this invention.

We claim as our invention:

1. Video signals reproducing apparatus for converting a first video signal recorded with a first field frequency in successive tracks on a single recording medium to a second video signal having a second field frequency different from said first field frequency, said apparatus comprising:
   track scanning means for reproducing said first video signal from said signal recording medium, said scanning means being movable in a direction perpendicular to the longitudinal direction along said tracks and reproducing only from said single recording medium sufficient ones of said tracks to form said second video signal;
   means for controlling the speed of said scanning means relative to said recording medium as a function of said second field frequency; and
   shifting means for shifting the position of said scanning means in said perpendicular direction in accordance with the difference between said first and second field frequencies.

2. Apparatus according to claim 1, in which said track scanning means comprises a rotary head and head displacement means on which said rotary head is mounted, said head displacement means being controlled by a control signal from said shifting means.

3. Apparatus according to claim 2; in which said head displacement means comprises a bi-morph.

4. Apparatus according to claim 1, further comprising means for converting the number of lines contained in each field of said first video signal to a different number of lines required for each field of said second video signal.

5. Apparatus according to claim 4, further comprising means for converting the color standard of said first video signal to that of said second video signal.

6. Video signal reproducing apparatus for converting a first video signal recorded with a first field frequency in successive tracks on a recording medium to a second video signal having a second field frequency different from said first field frequency, said apparatus comprising:
   track scanning means for reproducing said first video signal from said recording medium, said scanning means including a rotary head and head displacement means on which said rotary head is mounted, said head displacement means being controlled to move said rotary head in a direction substantially perpendicular to the direction along said tracks;
   means for controlling the speed of said scanning means relative to said recording medium as a function of said second field frequency; and
   shifting means for shifting the position of said scanning means in said substantially perpendicular direction in accordance with the difference between said first and second field frequencies, said shifting means including a circuit for generating a serrated wave signal having a frequency corresponding to the difference between said first and second field frequencies, and a circuit for generating a control signal by sampling and holding said serrated wave signal with a sampling signal having a frequency equal to said second field frequency, said control signal controlling said head displacement means to move said rotary head in said direction substantially perpendicular to the direction along said tracks.

7. Apparatus according to claim 6, in which said shifting means further comprises a circuit for generating a second serrated wave signal having a frequency equal to said second field frequency to compensate for the difference in inclination between the path scanned by said rotary head and the recorded track, said second wave signal being combined with said control signal.

8. Video signal reproducing apparatus for converting a first video signal recorded with a first field frequency in successive tracks on a recording medium to a second video signal having a second field frequency different from said first field frequency, in which said first video signal has a greater number of lines in each field than does said second video signal, said apparatus comprising:
   track scanning means for reproducing said first video signal from said recording medium, said scanning means being movable in a direction substantially perpendicular to the direction along said tracks;
   means for controlling the speed of said scanning means relative to said recording medium as a function of said second field of frequency;
   shifting means for shifting the position of said scanning means in said substantially perpendicular direction in accordance with the difference between said first and second field frequencies; and
   means for converting the number of lines contained in each field of said first video signal to a different number of lines required for each field of said second video signal including memory means, said first video signal being written into said memory means and read out therefrom so that a predetermined number of lines in each field of said first video signal are discarded to leave the number of lines per field required in said second video signal.

9. Apparatus according to claim 8, in which said memory means comprises a plurality of shift registers which are selectively connected with said tape scanning means, at least one line of said first video signal being memorized in each of said shift registers.

10. Apparatus according to claim 8, in which said converting means further includes a read clock generator for producing a read clock pulse having a frequency synchronized with the line frequency of said second video signal, and a write clock generator for producing a write clock pulse having a frequency different from said read clock pulse frequency and which is determined by the ratio of the number of lines in each field of said first video signal to the number of lines in each field of said second video signal.

11. Video signal reproducing apparatus for converting a first video signal recorded with a first field frequency in successive tracks in a recording medium to a second video signal having a second field frequency different from said first field frequency, with said second video signal further having a greater number of lines in each field than does said first video signal, said apparatus comprising:

track scanning means for reproducing said first video signal from said recording medium, said scanning means being movable in a direction substantially perpendicular to the direction along said tracks;

means for controlling the speed of said scanning means relative to said recording medium as a function of said second field frequency;

shifting means for shifting the position of said scanning means in said substantially perpendicular direction in accordance with the difference between said first and second field frequencies; and means for converting the number of lines contained in each field of said first video signal to a different number of lines required for each field of said second video signal, said means for converting including memory means, and said first video signal being written into said memory means and read out therefrom so that a predetermined number of lines in each field of said first video signal are repeated to result in the number of lines per field required in said second video signal.

12. Apparatus according to claim 11, in which said memory means comprises a plurality of shift registers which are selectively connected with said tape scanning means, at least one line of said first video signal being memorized in each of said shift registers.

13. Apparatus according to claim 12, in which said converting means further includes a read clock generator for providing a read clock pulse having a frequency synchronized with the line frequency of said second video signal, and a write clock generator for producing a write clock pulse having a frequency different from said read clock pulse frequency and which is determined by the ratio of the number of lines in each field of said first video signal to the number of lines in each field of said second video signal.

* * * * *